Patented June 17, 1941

2,246,463

UNITED STATES PATENT OFFICE 2,246,463

TREATMENT OF MOLD SURFACES

Louis D. Garratt, New Castle, Pa., assignor to Industrial Colloids Company, Emlenton, Pa., a partnership consisting of H. J. Crawford, George A. Breene, E. A. Willson, and Louis D. Garratt No Drawing. Application September 26, 1940, Serial No. 358,467

3 Claims. (Cl. 22—189)

My invention relates to the treatment of mold surfaces and more particularly to what I term graphite plating of molds and dies. It is especially useful in the treatment of molds for making glassware, but it is believed to be capable of use to great advantage also in the treatment of other types of molds or dies including molds for the molding of other plastics, ceramic materials, or metal such as molds or dies used in die casting.

In general, the object of the invention is to provide an improved method of treating mold surfaces which will prevent oxidation, which will provide a good parting medium, and which will automatically keep the mold surfaces clean of all foreign materials while in use, thereby greatly increasing the life of the molds.

A more specific object especially as applied to molds for glassware is to provide an improved and more durable plating or graphite film on the mold surfaces, which will be effective from the time when the mold is first put in the molding machine to prevent accumulations of oxide and other foreign materials and which will insure a perfect molded article from the time the molds are first put in the machine.

Other objects are to provide an improved mold surface which will facilitate the removal of molded articles from the mold; to provide a surface plating on the mold surface consisting of a film of graphite of microscopic thickness distributed uniformly over the mold surface; to provide a film of graphite which will remain in place and not build up lumps or high places on the mold surface; and to provide a method of treatment which will require as small amount of heat as possible and which will not be expensive in commercial use.

In the practice of my invention I employ only what I term "colloidal graphite," which is graphite in which the particles are of extremely small size and will not adhere to themselves. Furthermore, attempts to deposit a graphite film on the mold surfaces by the use of various binders, have all been unsatisfactory because the binder breaks down in use and will cause the mold surface to become uneven and dirty. Even the application of colloidal graphite to mold surfaces while the molds are in use in glass molding machines, as hereinafter more fully described, does not produce satisfactory results in itself.

My invention contemplates the depositing of a durable film of colloidal graphite on the mold surfaces before they are put into use along with the repeated applications of colloidal graphite while the molds are being used.

Having set forth in general the objects and purposes of my invention I will now describe one preferred embodiment of the process as it has been successfully employed in practice.

The surface of the metal mold to be treated is first thoroughly cleaned by any suitable method such as buffing, or by the use of polishing stones or abrasive cloths or papers, and washing with gasoline or naphtha. After the surface is thoroughly clean and dry the molds are placed in a suitable oven or furnace and heated to a temperature preferably between 250° and 450° F. The molds are then removed from the oven or furnace and before they have had time to cool substantially from the above mentioned temperatures, a solution of colloidal graphite and water is applied to the working surfaces of the mold.

Various proportions of the water in graphite may be used as will be evident to those practicing the invention. Preferably, however, I employ a solution of 7½ cubic centimeters to ten cubic centimeters of colloidal graphite per quart of water. Similar liquids other than water may be employed in some cases but I prefer to use distilled water because no residue is left when the distilled water is evaporated, on the surface of the mold. Water is more suitable than oil for the reason that the treatment can be carried out at a considerably lower temperature than would be the case if oil were used. When the molds are heated to from 250° to 450° F. the water will rapidly evaporate leaving a dry film of graphite on the mold without any residue.

The manner of application may be by any convenient means such as a power or hand spray gun or, in some cases, the molds may be dipped in a bath of the colloidal graphite and water, or merely swabbed with the solution. The molds are now re-heated to a higher temperature which in practice will depend upon the character of the mold and the particular kind of metal in the mold itself. I prefer to heat the mold to a minimum of 500° F. and employ somewhat higher heats when practical if the molds are of a character which will not be injured by the use of such higher heats.

This process results in the application to the working surfaces of the mold of a smooth and durable film of microscopic thickness which will be highly resistant to wear, oxidation and heat. It will be apparent that the pores of the metal have been impregnated with the particles of graphite and that the entire surface will have been covered with a very thin film of colloidal graphite which will adhere to the metal but due to the nature of colloidal graphite, it will not adhere to itself and thus build up a thicker film in some spots than might be desired.

In view of the fact that when the graphite is first applied to the metal surface it is in a somewhat heated condition, the water will quickly evaporate and the graphite film will adhere to the metal sufficiently well to allow the molds to be handled during subsequent heat treatment. The second heat treatment mentioned above where the molds are heated to a minimum of 500° F. will cause the graphite to impregnate the pores of the metal and to adhere firmly to the metal surface.

The molds may now be put in use immediately in a molding machine or they may be stored for any length of time until it is desired to use them. The graphite film will prevent the oxidation of the metal surface during such storing period.

Now when the molds are placed in the molding machine they will be clean and free from any deposit of oxide and they will already have on their surfaces a durable graphite film providing a high lustre or polish. They will therefore produce good results in operation from the time they are put into the machine and after they have been in operation in a glass molding machine, for example, for a sufficient time to heat the molds thoroughly, repeated applications of colloidal graphite suspended in oil may be made to maintain the surfaces in proper condition indefinitely. Any suitable proportions of graphite and oil may be used as will be evident to those skilled in the art.

Without the preliminary treatment it would be found that either the oxide on the metal surfaces or the accumulation of foreign matter and dirt on the mold surfaces before they are heated to the proper temperature, would not permit of satisfactory results merely from spraying the oil and graphite solution on the mold surfaces while in use in the glass molding machine.

The complete process, therefore, maintains the mold surfaces in a highly satisfactory condition throughout their period of service and in fact, they may continue this service for an indefinite period. The advantage of this process over prior methods which necessitates frequent removals of the molds from the machines and the cleaning of their surfaces by stones or by the use of abrasive wheels, abrasive cloths or papers, will therefore be obvious. The use of molds or dies plated with graphite in accordance with my invention enables the operators of glass machines and others, to increase their production and enables quicker starting of the machine and results in fewer rejections and defects in the molded articles. By eliminating the necessity for cleaning the mold surfaces by sand blasting or other abrasive processes the useful life of molds especially in glass making, is increased.

While I have described in detail one embodiment which my invention may assume in practice it will be apparent to those skilled in the art that various changes and modifications may be made without departing from my invention, the scope of which is defined in the following claims.

What I claim as my invention is:

1. A process of treatment of molds and the like which consists in heating the molds to a temperature higher than the boiling point of water but no higher than 450° F., applying to the surfaces of the mold cavities while in such heated condition a solution of colloidal graphite and water to deposit of film of colloidal graphite on said surfaces, then heating the molds to a temperature of at least 500° F. but below the temperature which would injure the mold to cause a substantial portion of the graphite to adhere firmly to the surfaces of the mold cavities.

2. The process of treatment of molds for making glassware which consists first in thoroughly cleaning the surfaces of the mold cavities, preliminarily heating the molds to a temperature of between 250° and 450° F., spraying on the mold surfaces while in such heated condition a solution of colloidal graphite and water to deposit a film of colloidal graphite evenly on the surfaces of the mold cavity, and then heating the molds to a sufficiently higher temperature greater than 500° F. but below the temperature which would injure the mold to cause some of the graphite to enter the pores of the metal and to deposit firmly on the mold surfaces an even film of graphite.

3. The process of treatment of molds for making glassware which consists first in thoroughly cleaning the surfaces of the mold cavities, preliminarily heating the molds to a temperature of between 250° and 450° F., and then spraying on the mold surfaces while in such heated condition a solution of colloidal graphite and water to deposit a film of colloidal graphite evenly on the surfaces of the mold cavity, then heating the molds to a sufficiently higher temperature greater than 500° F. but below the temperature which would injure the mold to cause some of the graphite to enter the pores of the metal and to deposit firmly on the mold surfaces an even film of graphite, placing the molds so treated in a glass molding machine and making repeated applications while the molds are in use in such machines of a solution of colloidal graphite and oil.

LOUIS D. GARRATT.